(12) United States Patent
Hawkins, Jr.

(10) Patent No.: US 10,016,783 B2
(45) Date of Patent: Jul. 10, 2018

(54) PROCESS FOR MAKING PAD FOR LOCALIZED INCREASE OF FRICTION

(71) Applicant: Joseph Mosher Hawkins, Jr., Cardiff-By-The-Sea, CA (US)

(72) Inventor: Joseph Mosher Hawkins, Jr., Cardiff-By-The-Sea, CA (US)

(*) Notice: Subject to any disclaimer, the term of this patent is extended or adjusted under 35 U.S.C. 154(b) by 0 days.

(21) Appl. No.: 15/478,192

(22) Filed: Apr. 3, 2017

(65) Prior Publication Data
US 2017/0203327 A1 Jul. 20, 2017

Related U.S. Application Data

(63) Continuation of application No. 14/137,716, filed on Dec. 20, 2013.

(60) Provisional application No. 61/740,121, filed on Dec. 20, 2012.

(51) Int. Cl.
| | | |
|---|---|---|
| *B05D 1/02* | (2006.01) | |
| *B32B 7/10* | (2006.01) | |
| *B32B 33/00* | (2006.01) | |
| *B05D 3/10* | (2006.01) | |
| *B05D 5/00* | (2006.01) | |
| *B05D 7/00* | (2006.01) | |
| *B05D 3/12* | (2006.01) | |
| *B32B 7/12* | (2006.01) | |
| *B63B 35/79* | (2006.01) | |

(52) U.S. Cl.
CPC .............. *B05D 1/02* (2013.01); *B05D 3/107* (2013.01); *B05D 3/12* (2013.01); *B05D 5/00* (2013.01); *B05D 7/52* (2013.01); *B05D 7/54* (2013.01); *B32B 7/10* (2013.01); *B32B 7/12* (2013.01); *B32B 33/00* (2013.01); *B63B 35/7936* (2013.01); *B05D 2502/00* (2013.01); *B05D 2502/005* (2013.01); *B32B 2255/10* (2013.01); *B32B 2255/28* (2013.01); *B32B 2317/00* (2013.01); *B32B 2475/00* (2013.01)

(58) Field of Classification Search
CPC . B05D 1/02; B05D 3/107; B05D 5/00; B05D 7/52; B05D 2401/20; B05D 2502/00; B05D 2502/005; B32B 7/10; B32B 33/00; B32B 2255/10; B32B 2255/56; B32B 2255/28; B32B 2256/06; B32B 2317/00; B63B 35/7936
USPC ................... 427/331, 334, 340, 421.1, 430.1
See application file for complete search history.

(56) References Cited

U.S. PATENT DOCUMENTS

| | | | | |
|---|---|---|---|---|
| 5,308,271 | A * | 5/1994 | Foulke ................ | B63B 35/7936 4/583 |
| 5,435,765 | A * | 7/1995 | Fletcher ................ | B63B 35/79 4/583 |
| 2002/0018877 | A1 * | 2/2002 | Woodall ................ | B23Q 1/032 428/180 |
| 2003/0124923 | A1 * | 7/2003 | Mercer ............... | B63B 35/7936 441/74 |
| 2003/0166364 | A1 * | 9/2003 | Gamble ................. | A43B 5/08 441/74 |
| 2007/0054573 | A1 * | 3/2007 | Skedeleski .......... | B63B 35/7936 441/65 |
| 2007/0155262 | A1 * | 7/2007 | Tung ................... | B63B 35/7936 441/74 |
| 2009/0111340 | A1 * | 4/2009 | Butler ................ | B63B 35/7906 441/74 |
| 2009/0162596 | A1 * | 6/2009 | Rios ....................... | A43B 13/04 428/45 |
| 2016/0144935 | A1 * | 5/2016 | Harrell ................ | B32B 7/06 156/247 |

FOREIGN PATENT DOCUMENTS

GB 2 457 687 A * 8/2009
WO WO 94/19414 A1 * 9/1994

* cited by examiner

Primary Examiner — William P Fletcher, III
(74) *Attorney, Agent, or Firm* — Mintz Levin Cohn Ferris Glovsky and Popeo, P.C.

(57) ABSTRACT

A method of making a friction pad comprising applying a soft bonding layer and a traction layer to a support sheet. The pad is easily exchangeable, non-fouling to its surroundings, and soft to bare skin.

6 Claims, 8 Drawing Sheets

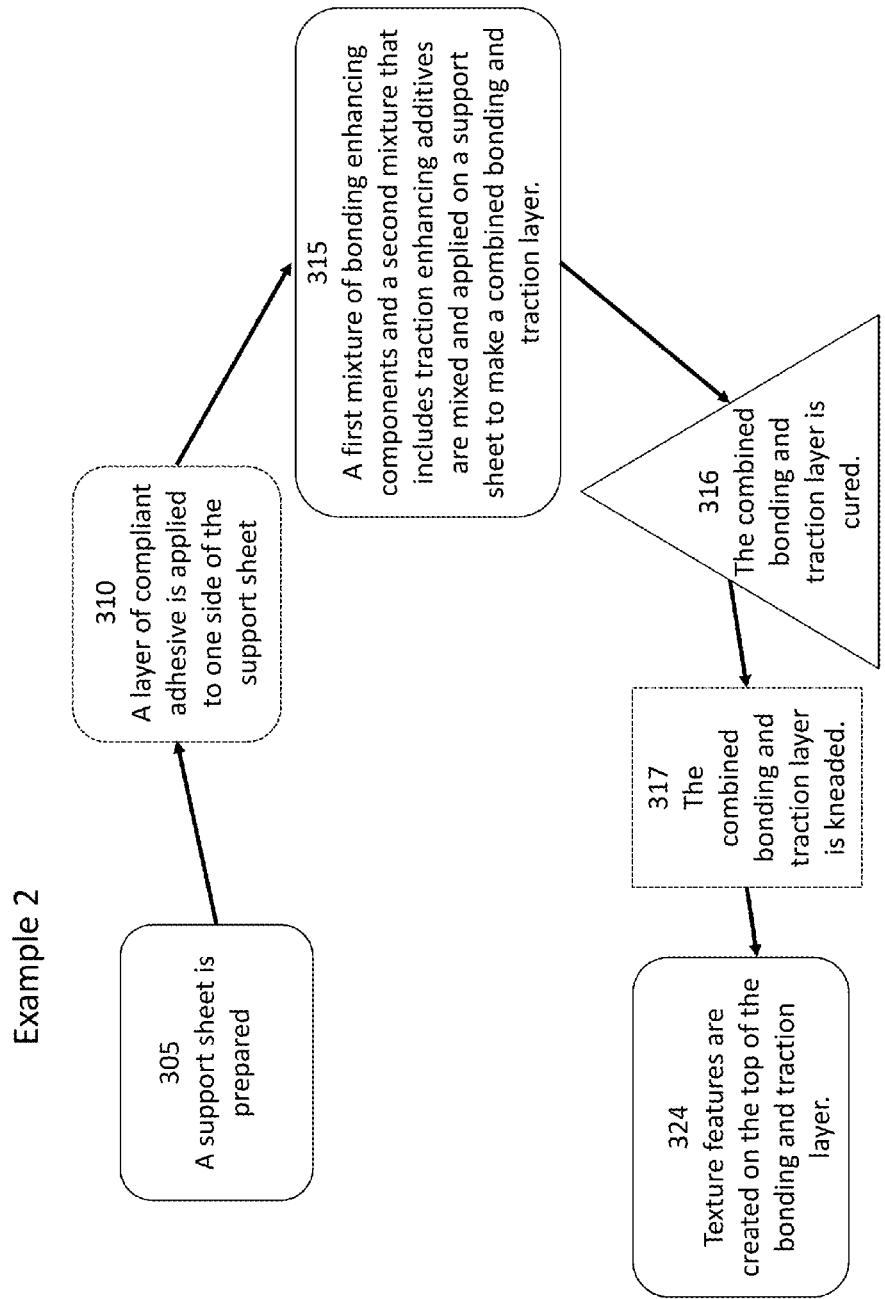

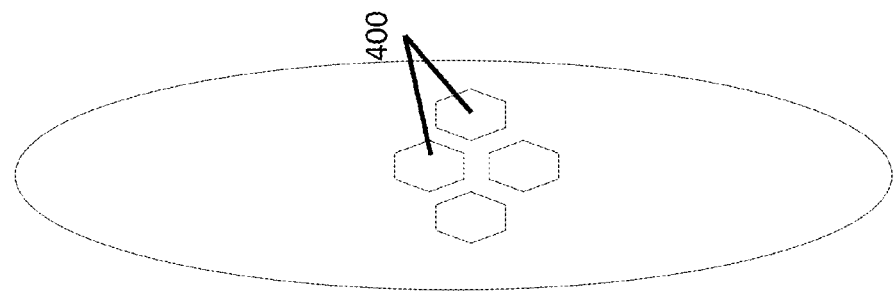
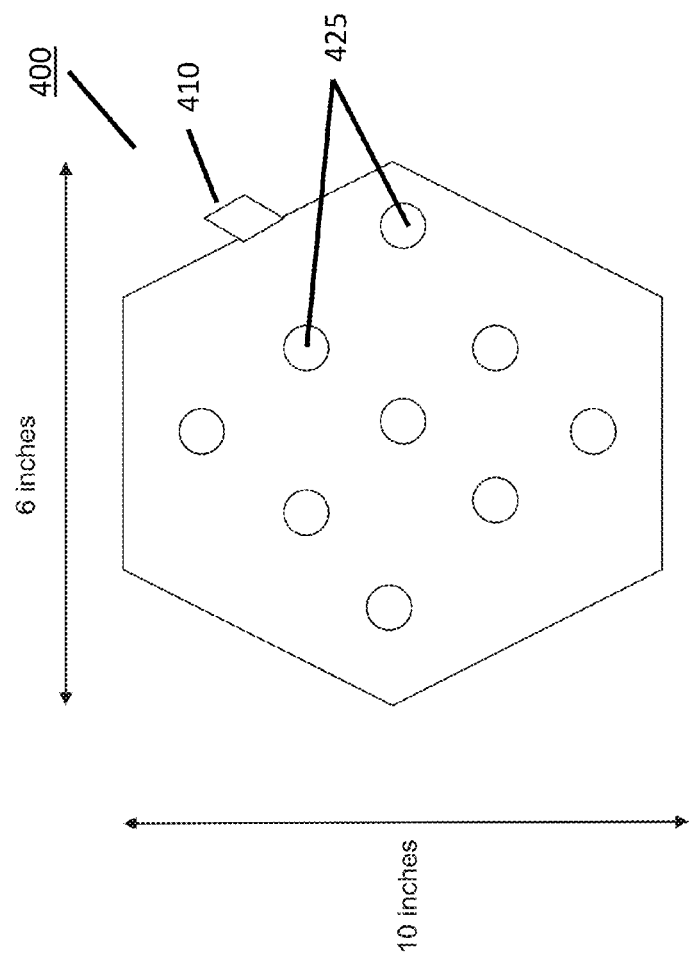
FIG. 4B
FIG. 4A

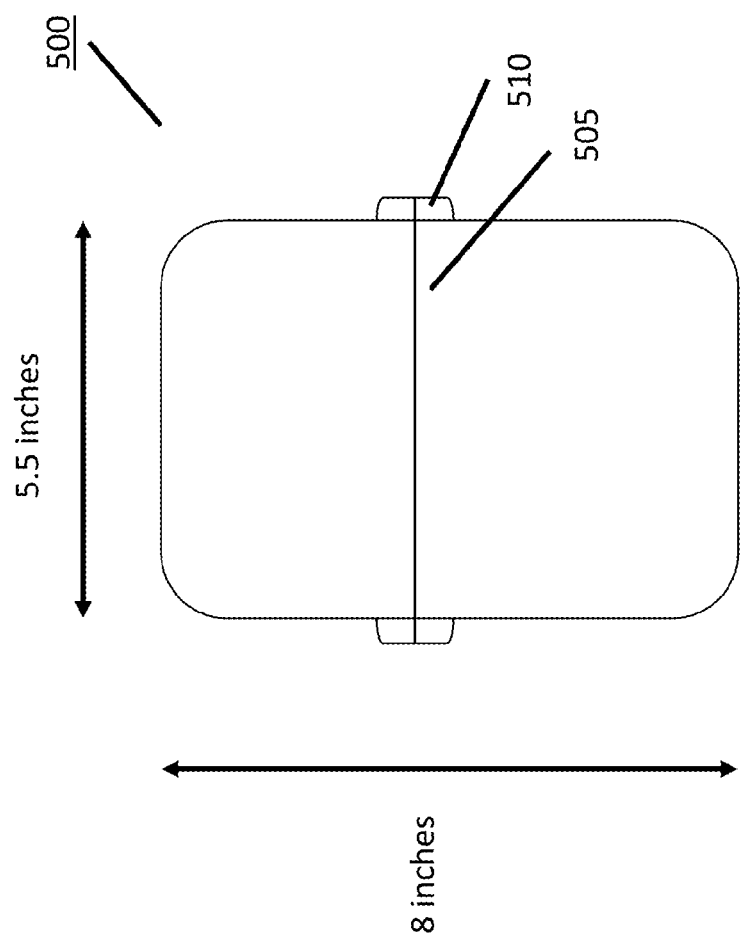

PROCESS FOR MAKING PAD FOR LOCALIZED INCREASE OF FRICTION

CROSS REFERENCE TO RELATED APPLICATION

This application is a U.S. Continuation Application that claims the benefit of priority to U.S. Non-Provisional application Ser. No. 14/137,716, titled "Pad for Localized Increase of Friction," and filed Dec. 20, 2013, which claims the benefit of priority under 35 U.S.C. 119(e) to U.S. Provisional Patent Application Ser. No. 61/740,121, titled "Solution Traction Pad," and filed Dec. 20, 2012, the disclosure of which is hereby incorporated by reference in its entirety herein.

TECHNICAL FIELD

The articles of manufacture, compositions, and methods described herein find use in sports and recreational activities. Particularly, the articles of manufacture, compositions, and methods provide for localized areas of increased friction on surfaces such as sports boards, vessel decks, and vehicle grip or standing surfaces, as well as on hand-held equipment including paddles and racquets.

BACKGROUND

There are situations when using a sports board or vehicle when increased friction between the equipment and a user is essential for optimal performance. For example, such situations include when a user wishes to ride on a sports board, such as a surfboard. Conventional means of increasing friction on surfboards include the application of wax and the use of rubber pads with texture imparting patterns.

Applying wax to a surfboard can be a time intensive endeavor that needs to be done frequently, as often as before each time the board is used. The wax can get dirty from sand, soil, and other items near or in the water and is typically useful for only one use. Old wax that is no longer sticky or effective at increasing friction between the board and a rider can require removal before applying new wax. Transporting a board that is waxed that does not have a board cover can also be messy, as wax can easily transfer from the waxed board to a car seat, car rooftop, or a person's clothing when carrying the board. However, wax does have the advantages of being inexpensive, widely accepted, and not harsh against the skin of a rider.

Permanent or semi-permanent rubber traction pads are an alternative to wax. The advantages of rubber traction pads over wax are that they are less messy because there is little to no material transfer from the pads to the surroundings, rubber traction pads do not usually require frequent reapplication, and rubber traction pads are often manufactured in colors that may not show discoloration easily. The disadvantages of rubber traction pads, from the standpoint of a surfboard rider, include the inability to easily customize the traction for the environment (e.g. water temperature), high initial cost, and the pain of the traction pad on bare skin when lying chest down on the board to paddle out.

Other types of surface treatments can be used to locally increase friction, such as the use of grip-tape, roughening a small surface area, and the like. These surface treatments can definitely increase friction between a user and the surface or equipment, however, some of these surface treatments can cause painful abrasions or unintended damage to the user in the course of normal use or during a fall.

SUMMARY

Provided herein is a friction pad that can include a flexible support sheet, and at least one layer on a first side of the flexible support sheet. The at least one layer can include a traction element that increases friction between a user and a surface to which the friction pad is adhered, as well as a soft bonding element capable of securing the traction element to the support sheet. The traction element is configured to cause little to no irritation or abrasion when in contact with bare skin of the user or delicate fabrics, such as wetsuit material.

The following features can be present in implementations of the friction pad in any reasonable combination. In some implementations, the friction pad can further include texture features on the at least one layer. In some such implementations, the texture features include dots, peaks, striations, or any combination thereof. The texture features can also include wax dots in a random array, in which the wax dots are created from liquid wax. Further, the texture features can be arranged with size ranges and spacing that corresponds to a use environment or a user's style. In some implementations, the support sheet can include a sheet of paper laminated in a polymer, polyolefin, natural paper, cardboard, synthetic paper, sheet rubber, cork, balsa wood, or sheet plastic. The soft bonding element can include natural rubber in some implementations of the friction pad. The traction element can include any of natural rubber, a water-based elastomeric texturing material, microcrystalline wax, coating agents, bonding agents, non-skid agents, petroleum jelly, and natural and synthetic sticky waxes. In some implementations, the friction pad further includes an adhesive layer, in which the adhesive layer covers a second side of the support sheet. In some such implementations, the friction pad can remain adhered to a surface in water from temperatures ranging from about 30° F. to about 90° F. The friction pad can be removable, and further upon removal, the finish of a surface to which the friction pad was affixed can show little to no damage. The increased friction and irritation against bare skin or delicate fabric of the friction pad can be within a tolerable range for more than one use. The materials properties of the friction pad can remain unchanged after many uses in some implementations. In some implementations of a friction pad, a first layer on the first side of the support sheet can include the soft bonding element and a second layer, above the first layer, on the first side of the support sheet can include the traction element. The soft bonding element and the traction element can be present in the at least one layer in a first concentration near the support sheet and in a second concentration away from the support sheet.

In a related aspect, a method of making a friction pad can include applying a mixture that can include a water-based elastomeric texture material and non-skid additive powder to a support sheet; forming a traction layer above the first layer; and creating texture on the traction layer to form a new friction pad.

The following features can be present in implementations of the method of making a friction pad in any reasonable combination. In some implementations, the method of making a friction pad can include kneading the support sheet and any layers on it after a curing period. In some such implementations, the curing period comprises curing the support sheet and any layers on it at room temperature. Creating texture on the traction layer can include at least one of: depositing liquid wax on the surface of the traction layer; applying organic material to the surface of the traction layer; applying compliant material to the surface of the traction layer; applying transient or degradable material to the surface of the traction layer; and creating pits, valleys, or depressions in the traction layer.

Further, in a related aspect, a method is presented that can include securing a support sheet to a traction layer using a soft bonding layer, the support sheet capable of being folded and wrapped around small radii without damaging the support sheet, the traction layer configured to cause little to no irritation or abrasion when in contact with bare skin of a user or delicate fabric, and adhering the traction layer to a surface of an apparatus.

To remedy the short-comings of wax and rubber friction pads, an article and methods of providing lasting, non-permanent increased friction between a surfer and a board, or any user and a surface to be contacted during an activity, that is affordable, durable, comfortable (e.g. when next to bare skin or sensitive surfaces), and not damaging or fouling to surroundings would be ideal.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 3 is a process flow diagram illustrating another implementation of making a friction pad.

FIGS. 4A and 4B illustrate a shape of a friction pad and an implementation of friction pads on a surfboard.

FIGS. 5A and 5B illustrate another shape of a friction pad and other implementations of friction pads on surfboards.

Like reference symbols in the various drawings indicate like elements.

DETAILED DESCRIPTION

Disclosed herein are articles of manufacture, compositions, and methods that provide for localized areas of increased friction on surfaces that are affordable, durable, comfortable (e.g. when next to bare skin or sensitive surfaces), and not damaging or fouling to surroundings. Removable friction pads which include at least a support sheet with adhesive on a first side and a soft bonding layer and a layer of texture with non-skid features on the second side are provided. Methods of creating such friction pads, as well as methods for using the friction pads are also provided. While the following is mainly directed to the use of a removable friction pad in connection with surfboards, it will be appreciated that the current subject matter can be applied to a variety of applications in which increased friction is desirable between a user's body (e.g., hand, foot, etc.) and an apparatus (e.g., sporting equipment, etc.).

The Friction Pad: Characteristics and Composition

Removable friction pads can be applied to clean surfaces in locations and patterns that suit the style of the user. The removable friction pads can be made of materials that include multiple layers with different properties. The portion of the friction pad adjacent the surface adheres strongly to the surface, but with little to no damage to the finish of the surface when the friction pad is removed. The portion of the friction pad that the user contacts provides increased friction between the surface and user without abrading or irritating bare skin on most persons or delicate fabrics, such as wetsuit materials. This topmost portion can be durable enough to last multiple uses and may also not transfer material to surroundings such as clothing, vehicle interiors, and other things with which the pad may come into contact.

Friction can be increased through the materials properties of the topmost portion, such as tackiness, viscosity, surface tension, and the like. Friction at the topmost portion can also be increased due to macroscopic features of the friction pad. Such macroscopic features can include striations, lattice patterns of striations, dots, peaks and valleys, pits, and the like.

Figure 1A:
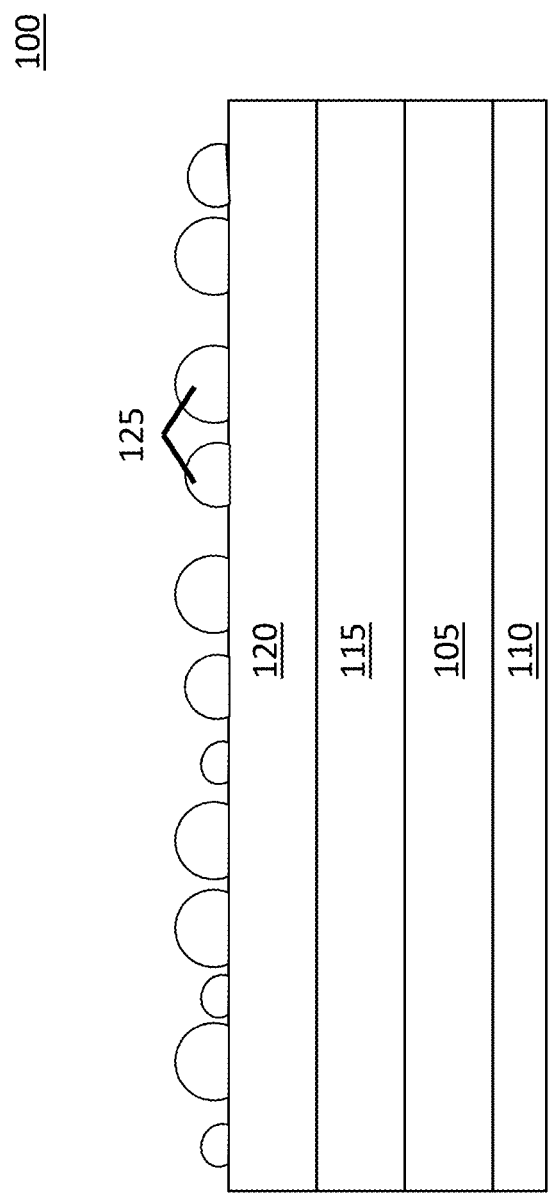
FIG. 1A and FIG. 1B are cross-sectional views of implementations of a friction pad.

FIG. 1A is a cross-sectional view of an implementation of a friction pad 100. The friction pad 100 includes a support sheet 105, and adhesive layer 110, a soft bonding layer 115, and a traction layer 120. The traction layer can include texture features 125. The layers are shown as distinct layers, however, the layers can have discrete transitions in materials or materials properties, or the layers can have gradual transitions from one material or materials property to the next.

The support sheet 105 is a sheet of material about 0.003 inches (0.00762 cm) thick. The support sheet is a flexible sheet that can be made from a sheet of paper laminated in a polymer, a high-gloss laminate of polyolefin, natural paper, cardboard, synthetic paper, sheet rubber, sheet plastic, or any other suitable flexible material. Flexible material includes material that can be bent, folded, or wrapped around small radii without damaging the material. The support sheet 105 can be visible once the friction pad 100 is applied to the board. Because of this, the support sheet 105 can be decorated or printed with a design, such as logo, including the manufacturer's logo, a surf equipment maker's logo, an ideological logo, or some other artistic design or reproduction of a photograph. In some instances, the support sheet 105 can include clear lamination about the support sheet 105 to protect a decoration or design. Such clear lamination about the support sheet 105 can be up to about 0.003 inches (0.00762 cm). In other implementations, a design or logo can be applied on top of the traction layer 120. In such implementations, when the design or logo is applied on top of the traction layer 120, the design or logo can be applied using colored media, such as a colored wax or polymer, or using ink. The protective film or layer on the side of the adhesive layer 110 that is designed to attach to a board, or other piece of equipment, can have a logo or design on it.

On a first side of the support sheet 105 can be an adhesive layer 110. The adhesive layer 110 can be any suitable adhesive that can withstand temperatures of 30° F. to 90° F. (−1.1° C. to 32.2° C.) in water while maintaining adhesion of the friction pad 100 to the surface (e.g. board). Additionally, the adhesive layer 110 can be removed from the surface cleanly, without leaving a substantial residue or without extensive damage to most surface finishes. The adhesive layer 110 can be about 0.003 inches (0.00762 cm) or thinner. Alternatively, the adhesive layer 110 can be about 0.003 inches (0.00752 cm) or thicker, such as about 0.004 inches (0.01016 cm), or 0.005 inches (0.0127 cm), or more. The adhesive layer 110 can be pre-applied and covered by a protective film, to prevent the friction pad 100 from adhering to an unintended surface. Conversely, the adhesive layer 110 can be applied from an applicator, such as a spray applicator, a tube, or a pen, prior to placing the friction pad 100 on the board or other surface. In other implementations, the adhesive layer 110 can be present but can benefit from activation, such as contact with moisture or an activating solution, prior to affixing the friction pad 100 to the board or other surface.

On the second side of the support sheet 105 can be a soft bonding layer 115. The soft bonding layer 115 allows the traction layer 120 and any texture features 125 to firmly adhere to the support sheet 105. The thickness of the soft bonding layer 115 may vary during the production of the friction pad 100. The thickness of the soft bonding layer 115 once the friction pad 100 is adhered to the board can be about 0.003 inches (0.00762 cm) or thinner. In some implementations, the thickness of the soft bonding layer can be about 0.003 inches (0.00752 cm) or thicker, such as about 0.004 inches (0.01016 cm), or 0.005 inches (0.0127 cm), or more. A single material or a mixture of materials can make up the soft bonding, or transition, layer 115. The soft transition layer 115 can also be a layer of gradual change in materials and materials properties between a laminate layer on the support sheet 105 and the traction layer 120.

Figure 1B:
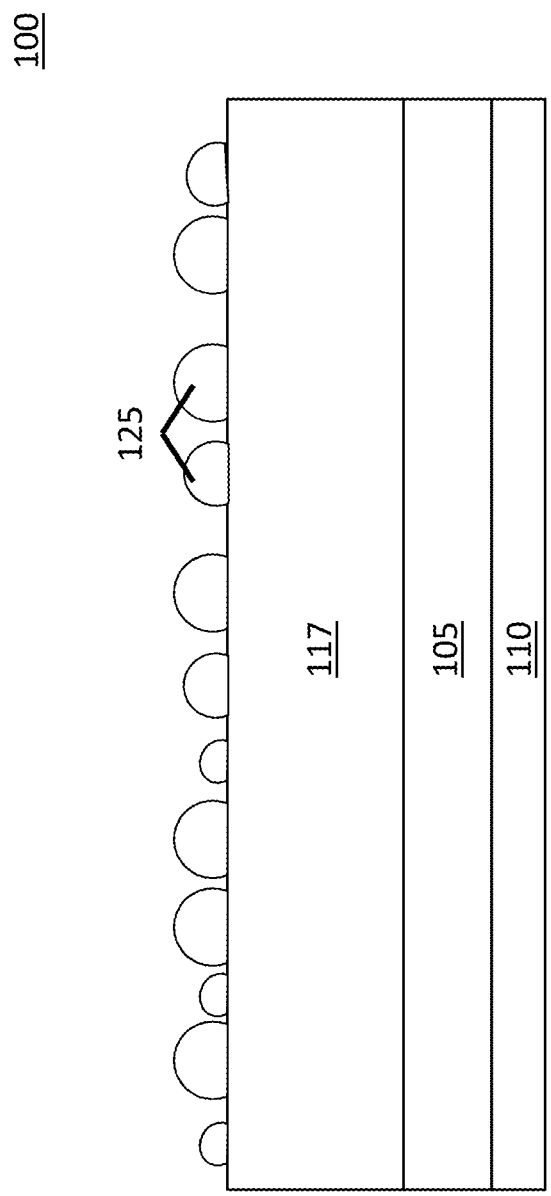

FIG. 1B is a cross-sectional view of an implementation of a friction pad 100 in which a single layer 117 has characteristics of the soft bonding layer 115 (e.g. soft bonding element) and the traction layer 120 (e.g. traction element). As in the friction pad 100 shown in FIG. 1A, the friction pad shown in FIG. 1B can have a support sheet 105, an adhesive layer 110, and texture features 125. However, instead of distinct layers for the soft bonding layer 115 and the traction layer 120, the friction pad 100 shown in FIG. 1B has a combination layer 117. In such implementations, bonding materials, or elements, and traction materials (e.g. traction elements) can be combined and applied simultaneously, in some instances with mixing prior to application to the support sheet 105. In such a combination layer 117, the bonding elements and the traction elements can have a first concentration, either absolute or in relation to each other, near the support sheet 105 and a second concentration away from the support sheet, such as at the free surface of the friction pad 100 that is design to contact a user's body.

The traction element can include any of natural rubber, a water-based elastomeric texturing material, microcrystalline wax, coating agents, bonding agents, non-skid agents, petroleum jelly, and natural and synthetic sticky waxes.

As seen in FIG. 1A, above the soft bonding, or transition, layer 115 is the traction layer 120. The traction layer 120 can be about 0.03 inches (0.0762 cm) thick. The traction layer 120 can include a mixture of materials, applied in a liquid state which can interact to create a sticky gel-like solid material. The materials that make up the traction layer 120 can include natural rubber, a water-based elastomeric texturing material, microcrystalline wax, coating agents, bonding agents, non-skid agents, petroleum jelly, and natural and synthetic sticky waxes. Sticky waxes can include beeswax, paraffin, microcrystalline wax, and soy wax.

Texture features 125, as shown in FIG. 1A and FIG. 1B, can sit in or on the traction layer 120 or combination layer 117, or the texture features 125 can be embedded in traction layer 120 or combination layer 117. Texture features 125 can include dots, striations, peaks, or other protrusions, in some cases of no regular outline. Such texture features 125 can be made by sticky waxes, microcrystalline wax, rubber, synthetic polymers, foamed bubbles in the traction layer 120, and the like. Organic materials can also be used to impart texture features 125, including biodegradable materials, such as balsa wood, apricot seed granules, ground up seashells, and other materials sourced from nature. Texture can also be imparted by depressions, such as pits or holes, into the traction layer 120.

A protective layer can cover the traction layer 120 and texture features 125 of the friction pad 100. The protective layer can prevent the traction layer 120 from interacting with materials of surfaces which can shorten its lifetime prematurely. In the implementations where the traction layer 120 can change materials properties with exposure to air or solution, for example by contact with water (e.g. seawater, fresh water, water at an elevated temperature, etc.) or an activating solution, the protective layer can prevent accidental exposure of the traction layer 120. The protective layer that can cover the traction layer 120 can be wax paper, a polymer film or sheet, a foil or the like. Though the protective layer is described hereinabove with respect to the traction layer 120 and texture features 125, the protective layer can also be used with the combination layer 117 and any texture features 125 present.

The layers described in the friction pad 100 can be combined in any suitable manner, such that discrete layers are not discernable, and a continuum of composition and materials properties exist. In some implementations, the soft bonding layer and the traction layer can be combined. Alternatively, or additionally, the support sheet and the soft bonding layer can be combined.

In some implementations, the traction layer 120, combination layer 117, and/or texture features 125 can have different materials properties after exposure to liquids, air, or other components of the environment. The materials properties that can change include, but are not limited to, stickiness, hardness (e.g. roughness against bare skin or delicate fabrics), viscosity, surface charge, and density. Liquids can include fresh water, saline solution, seawater, tepid water, and the like. In some implementations, changes in the materials properties of the traction layer 120, combination layer 117, and/or texture features can occur with the first use of the friction pad 100, for example, the first time, after application of the friction pad 100 to a piece of equipment, that friction pad 100 is used in the ocean or another body of water. Alternatively, the materials properties of the traction layer 120, combination layer 117, and/or texture features 125 can be stable over many uses of the friction pad 100, including after exposure to numerous liquids and temperatures.

Friction Pad Fabrication

Friction pads, as described herein above, can be made from materials applied in liquid and solid form in layers upon the support sheet. On a first side of the support sheet can be an adhesive layer for securing the friction pad to a surface. The support sheet, on a second side, can be decorated with a design, including a logo or reproduction of a photograph, and a layer of clear lamination can protect the design.

On the second side of the support sheet, a soft bonding layer can be deposited. The soft bonding layer can be a polymer, such as a natural rubber, silicone, a hydrogel, or any combination thereof. The soft bonding layer can also be a transition layer that has a changing composition along its thickness, so that near the support sheet it has a first composition, A, and the portion of the layer furthest away from the support sheet, the soft bonding layer has a second composition, A+B. The soft bonding layer can be applied in any suitable manner to achieve an overall thickness of about 0.003 inches (0.00762 cm) or less, or alternatively, until an overall thickness of about 0.003 inches (0.00752 cm) or thicker, such as about 0.004 inches (0.01016 cm), or 0.005 inches (0.0127 cm), or more is achieved. Suitable application methods can include using a roller, a paint brush, spraying techniques, dripping techniques, electrostatic techniques, or any combination of any of these methods.

After deposition of the soft bonding layer, the layer and support sheet can be cured and worked, or kneaded, to ensure adhesion between the soft bonding layer and the support sheet is strong and free of pockets of air between the layers.

Curing can include allowing the soft bonding layer and support sheet to rest at room temperature, or at a predetermined temperature, such as 75° F. (23.89° C.). Exposure to direct sunlight or ultra-violet radiation (UV) for a predetermined amount of time can also be a part of curing. UV can include light with a wavelength of 400 nm to 10 nm. Exposure to direct sunlight or UV can be for a predetermined length on the order of hours, such as one or two hours, or on the order of minutes, such as five or ten minutes.

Working or kneading the support sheet and the layers adhered to it can involve repeatedly moving the sheet and layers about a fixed object, pressing and rolling the sheet and layers together, applying pressure to the entire area of the support sheet and layers, or any combination thereof. Working or kneading can be done for a fixed time or until a certain materials property, such as viscosity, resistance to shear force, hardness, etc., is observed to meet a threshold value. For example, the support sheet with the soft bonding layer can be kneaded by passing it over a tube with a 6-inch diameter in every direction for a total of 2 minutes.

On top of the soft bonding layer, the traction layer can be built up. Multiple compounds, mixtures, and solids can be combined to create the traction layer. The traction layer can be deposited as a liquid or a slurry, or as a series of liquids or slurries with a curing and working (e.g. kneading) period between deposition of each liquid or slurry. The traction layer can include melted wax, non-skid additive powder, acrylic polymer emulsion, monomer solutions, bubbles of air or other gas, foam, transient or degradable structures, or any combination thereof. The liquids and/or slurries of the traction layer can be applied to the support sheet and the layers above it using any suitable application method, such as by using a roller, a paint brush, spraying techniques, dripping techniques, electrostatic techniques, or a combination of any of these methods.

Between deposition of layers, a roughening can occur. A roughened surface, such as sand paper, can be pressed into the layers deposited above the support sheet at a pre-defined pressure and/or duration. Once the roughened surface is removed, debris can be removed by shaking, brushing, or the use of compressed matter, such as compressed air.

In some implementations, the soft bonding layer and traction layer can be a single, combination layer instead of discrete layers. The combination layer can have a homogenous composition throughout its thickness. Alternatively, the combination layer can have one composition near the support sheet and another composition away from the support sheet, where a user would contact the friction pad.

Texture features can be added to the traction layer or the combination layer. The texture features can include patterns of features, such as dots, peaks, lattices, striations, or any combination thereof. Randomized features can be present on the traction layer. In some implementations, both patterned and randomized features can be present on the traction layer. The texture features can be varied to correspond to different use styles or environments. For example, in surfing, different water temperatures can correspond to different feature sizes and spacing (e.g. pitch). Texture features are created using any of hot, melted wax, foam beads, bio-degradable items, transient items such as molds or presses, and the like. Scoring, dripping, pressing, puncturing, poking, injection, and the like can be used to create texture features.

Following deposition, or addition, of the texture features into or on the traction layer, an optional layer can be applied to the top surface, forming a friction pad. The optional layer above the traction layer can be a thin layer of wax or other suitable material. An optional heat treatment at an elevated temperature, such as to 200° F. (93.3° C.), for a short period of time can set the friction pad to create a cured friction pad. In some implementations, the optional layer can be left to dry, such as by being exposed to ambient temperatures and environment for sufficient time. Kneading or pressing the friction pad can be done after the optional heat treatment or drying to ensure cohesion between the layers. A design or logo can also be applied above the texture layer, as part of the optional layer, or the design can be applied after heat treatment of the friction pad.

The final friction pads can have a viscosity such that when a support sheet is tilted 47°, little to no displacement of an object resting in contact with the friction pad is seen when no shear force is applied. The final friction pads can maintain adhesion to a surface, as well as maintain their materials properties, when exposed to pressures equivalent to a 20 foot wave of water.

Though the creation of friction pads is described as a handmade process, it should be appreciated that certain tasks can be automated while some are maintained as tasks done by human hand. For example, a large stamp press, a spray applicator, an oven, a heat gun, or any combination thereof can be used to automate some of the friction pad fabrication.

Figure 2A:
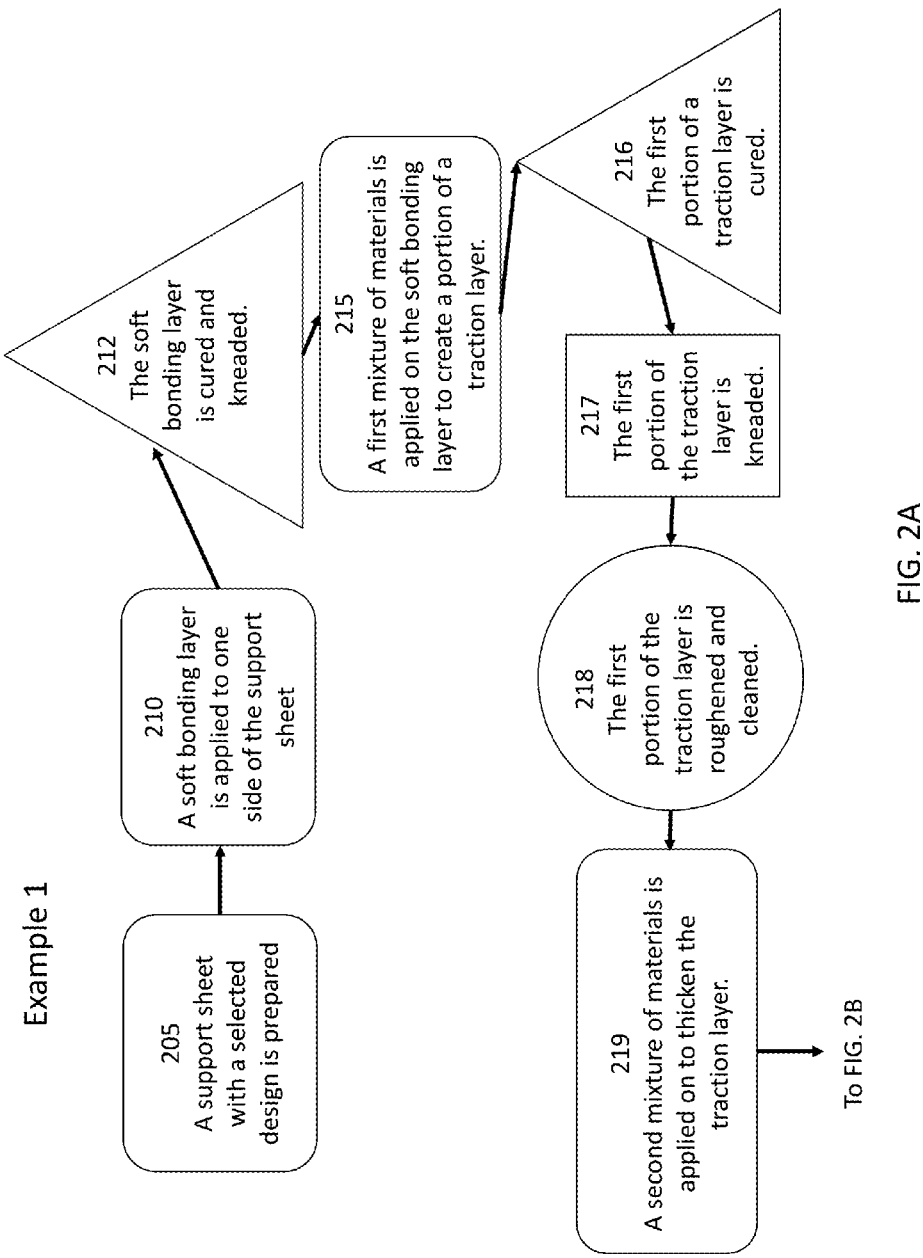
FIGS. 2A-2B are process flow diagrams illustrating making a friction pad and for applying a pad to a surfboard.
Figure 2B:
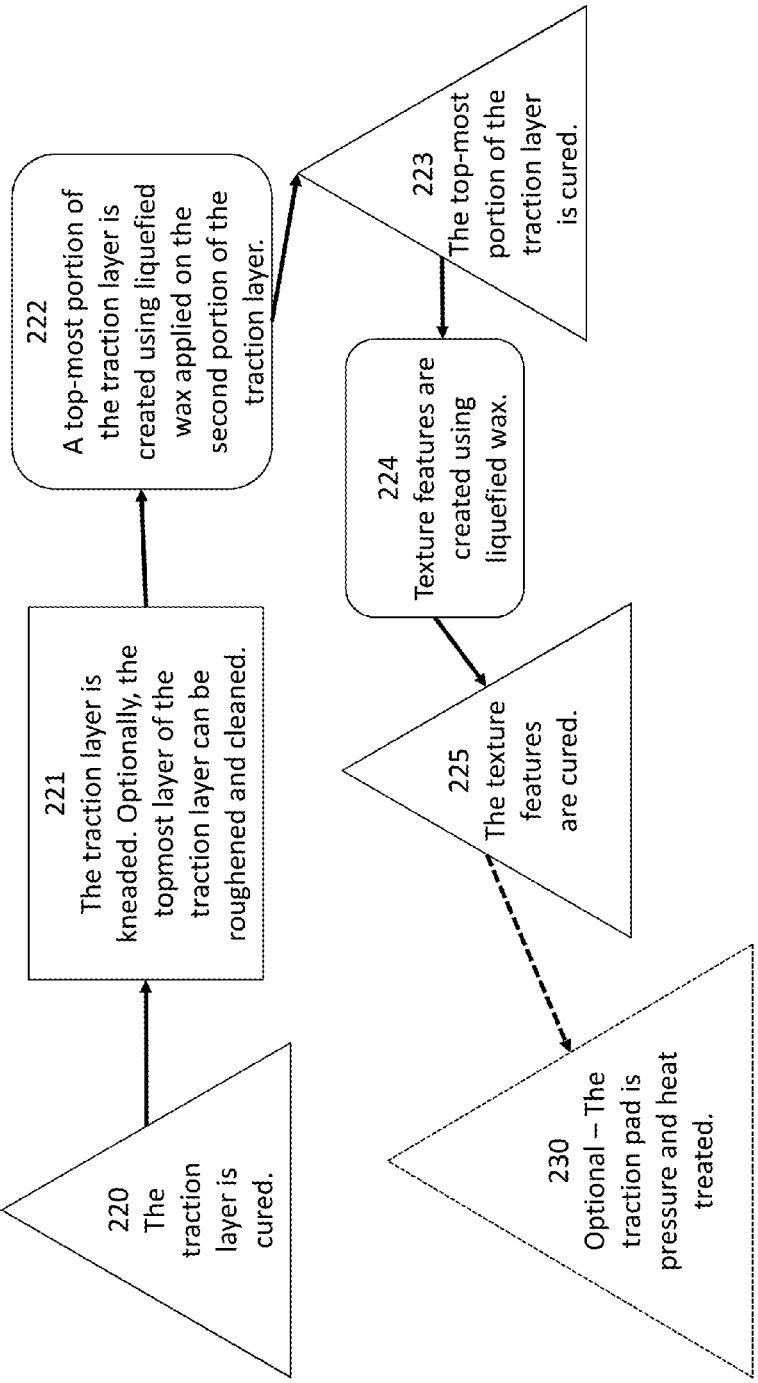

An exemplary method of fabricating such friction pads is shown in FIGS. 2A-2B and described in the prophetic example, below.

EXAMPLE 1

Multiple pieces of the support sheet, about 0.003 inches thick, are prepared with a selected design that is applied, as shown in box 205 in FIG. 2A. The support sheet (105 in FIGS. 1A and 1B) is any suitably resilient, flexible material, such as squeezable polyolefin high gloss laminate, paper laminated in a polymer, a high-gloss laminate of polyolefin, natural paper, cardboard, synthetic paper, sheet rubber, sheet plastic, cork, balsa wood, or any combination thereof. The bottom side of each support sheet includes a sticky adhesive glue.

A soft boding layer (115 in FIG. 1A) is applied to the topside of each support sheet, until the soft bonding layer is about 0.01 inches thick, box 210 of FIG. 2A. The amount of soft bonding layer material that can be added can be about 2.0 grams of material, such as 1.0 to 3.0 grams of material, or about 1.5 to about 2.5 grams of material. The roller can be a ⅜ inch diameter polyester roller, a ½ inch diameter roller, a ¼ diameter roller, or a roller with a diameter ranging from ¼ inch to 1 inch. The soft bonding layer can be about 0.01 inches thick, or it can be thinner, such as 0.008 inches thick, including 0.005 inches thick or thinner. The soft bonding layer can be about 0.01 inches thick or more, such as 0.015 inches thick or thicker, including 0.02 inches thick or more. The soft bonding material can include natural rubber, silicone, compliant synthetic polymer compositions, inorganic polymer compositions, foamed material, and any combination thereof.

Each support sheet and soft bonding layer cures for about 2 hours at room temperature and then is placed in direct sunlight for about 20 minutes. Following this curing, each support sheet with rubber is passed over a tube with about a 6 inch diameter in every direction for a total of 2 minutes. Curing and kneading are shown in 212 of FIG. 2A. This kneading or pressing motion is repeated after the addition of more material to the support sheet and serves to soften the material, extract air pockets, and allow the person creating the friction pad to ensure that there is no separation between the support sheet and other materials. The amount of time for curing at room temperature and/or in direct sunlight can vary and can be an amount of time sufficient to allow the material of the soft bonding layer to go from a flowable material to a highly-viscous, gel-like material. The amount of time spent kneading can vary and can be any time sufficient to allow for the release and removal of any trapped air or other points where contact is lost between any two layers in the friction pad, such as the support sheet and soft bonding layer.

A first mixture of materials is applied on the soft bonding layer, as in box 215. The first mixture can include approximately one part microcrystalline or paraffin wax that is heated until liquid, about 295° F.; approximately three parts water-based elastomeric texture solution; and approximately one part non-skid additive powder or other friction enhancing additive. About 5.5 grams of this first mixture are applied to the soft bonding layer on each of the support sheets using a contour roller with about a ⅜ inch diameter to a thickness of about 0.02 inches. The amount of the first mixture applied on top of the soft bonding layer can be in a range from about 2.5 grams to about 8.5 grams, such as from 4.5 grams to about 6.5 grams, including about 5.0 grams to about 6.0 grams. The final thickness of the layer of material that includes the first mixture can range from about 0.005 inches to about 0.035 inches, such as from about 0.01 inches to about 0.03 inches, including from about 0.015 inches to about 0.025 inches. The means of applying the first mixture to the support sheet and soft bonding layer can be can be a roller means, a spraying means, a pouring and spreading means, or a combination thereof.

This first mixture on the support sheets with a soft bonding layer is cured for 24 hours at room temperature, and then placed in direct sunlight for 1 hour to create a first layer, 216. The support sheets, each with their first portion of the traction layer, are kneaded, as before, by passing over a tube with about a 6 inch diameter in every direction for 2 minutes total, as in box 217. As mentioned above, with respect to box 212, the curing and kneading parameters can vary so that suitable materials characteristics and layer-to-layer adhesion are achieved.

An abrasive surface, such as light grade sand paper, is used to evenly apply pressure across the first portion of the traction layer. Compressed air blows away loose particles following this sand paper treatment. This roughening step correlates to 218 of FIG. 2A.

A second mixture of about 1 part non-skid additive powder and about 1 part acrylic polymer emulsion is applied to each support sheet, above the first portion of the traction layer; to a thickness of about 0.01 inches using a ⅜ inch polyester roller to create thicken the traction layer, as in box 219. This thickened traction layer is cured for 24 hours at room temperature, and then placed in direct sunlight for an hour, represented by step 220 in FIG. 2B. Following this curing, each support sheet with a thickened traction layer is kneaded, as described above, as in 221. As with the application of the first mixture, the application of the second mixture can entail the use of any suitable applying means, and the curing and kneading can vary in time, temperature, and environment to achieve the desired materials properties and layer-to-layer adhesion.

Optionally, for a second time, the thickened traction layer on each support sheet is then treated with light grade sand paper that is pressed with even pressure into the uppermost layer of the built up first layer. Compressed air is again used to remove any debris from the roughening, if a second roughening is done.

Approximately one part microcrystalline wax is heated to a sufficient temperature to liquefy the wax, such as to about 295° F. This liquid wax is applied to a thickness of about 0.1 inches on the thickened traction using a polyester roller of about ⅜ inch diameter to create a top-most portion of the traction layer, shown as step 222. This top-most portion of the traction layer is cured at room temperature for 5 minutes, as in step 223 of FIG. 2B, then each support sheet with traction layer is kneaded, as described previously.

Texture features can be created on or in the top-most portion of the traction layer, box 224. If needed, more microcrystalline wax is liquefied at 295° F., and liquid wax is dropped from 3 feet (91.5 cm) onto the traction layer. Any suitable delivery apparatus for applying liquid wax can be used, such as a stainless steel syringe, a spray apparatus, a bulk drip apparatus, an extrusion apparatus, a drip apparatus, or a combination thereof. The texture features can be created in a pattern or randomized, or have randomization over a short distance, such as 30 cm, but have a pattern over a large distance, such as a meter. Lines, circles, dots, zig-zags, or any other suitable shapes can be formed when forming the texture features. The pattern of texture features can change depending on the intended use of the friction pad. For example the pattern of texture features on a friction pad destined for use in cold water can be different from the pattern for a pad destined for use in warm water, or fresh water versus salt water. Once the texture features are formed, they are cured for about 5 minutes at room temperature, then the sheets are kneaded, and compressed air is used to remove any particles from stray wax or the like. Creation of these texture features is represented by 224 and curing is represented by 225 in FIG. 2B. As described above, curing and kneading can have varied parameters, such as time and temperature, to achieve the desired materials properties and layer-to-layer adhesion.

As an optional procedure, a sheet of paraffin wax is placed over each of the support sheets, and approximately 2 ounces of salt water that is heated to about 120° F. is sprayed over each of the paraffin wax papers. Following this, about 80 pounds of pressure is evenly distributed to the entire area of each support sheet for about five (5) minutes to set the traction and soft bonding layers. The wax paper is removed, and the new friction pads are heated to about 200° F. for one minute, then kneaded or pressed, as described above. This quick heating to about 200° F. for one minute can provide some improved performance in the friction pad, but is an optional procedure, and is represented by 230 in FIG. 2B.

EXAMPLE 2

FIG. 3 provides a flow chart for the methods in the following example of creating a friction pad.

A support sheet is prepared, as shown in box 305. The support sheet is either one large piece that can be cut to size after creation of the friction pad or it can be one of a set of multiple support sheets that are pre-sized. The support sheet includes any suitably resilient, flexible material, such as squeezable polyolefin high gloss laminate, paper laminated in a polymer, a high-gloss laminate of polyolefin, natural paper, cardboard, synthetic paper, sheet rubber, sheet plastic, cork, balsa wood, or any combination thereof. The thickness of the support sheet is about 0.001 to 0.005 inches, such as about 0.002 to 0.004 inches, such as about 0.003 inches. Preparation of the support sheet includes any of cutting it to size, cleaning the front side of the support sheet, and, optionally, applying any designs or logos.

On the back side of the support sheet, a layer of adhesive is applied, as in box 310. The adhesive layer can be covered with a protective covering, so that the adhesive will not be exposed until bonding of the friction pad to a surface is desired. The application of adhesive is optional, as the friction pad may be produced without an adhesive layer and an adhesive composition can be applied prior to use of the friction pad.

In box 315, the mixture of bonding components and traction enhancing additives is presented. Bonding components and traction enhancing additives are combined and then applied as a layer above the layer of compliant adhesive. Bonding components can include natural rubber, silicone, compliant synthetic polymer compositions, inorganic polymer compositions, foamed material, and any combination thereof. Traction enhancing additives can include non-skid additive powder, acrylic polymer emulsion, natural wax, micro-crystalline wax, paraffin wax, and any combination thereof.

This single, combined layer can have both bonding and traction characteristics and replaces the separate bonding and traction layers. This combined bonding and traction layer is cured, 316, using any of heat, pressure, and radiation, then the layer is optionally kneaded 317. Curing takes place until a satisfactory bond between the combined layer and the support sheet is formed. Heat, pressure, or radiation (e.g. UV light) are among the conditions varied to optimize curing. Kneading removes any air or other bubbles that form between layers and also improves boding between layers, such as the support sheet and combined layer.

After application, curing, and kneading the combined bonding and traction layer, texture features can be added 324 into or onto the top of the combined layer. Texture features are created using any of hot, melted wax, foam beads, bio-degradable items, transient items such as molds or presses, and the like. Scoring, dripping, pressing, puncturing, poking, injection, and the like can be used to create texture features.

Friction Pad Use

One or more friction pad can be used in any application where sensitive skin, bare skin, or delicate fabrics can benefit by an area of increased friction that is clean and not abrasive or irritating. Additionally, the friction pads described above can be used where the user does not wish to invest as much time and effort to use traditional wax or as much money to use conventional rubber traction pads, with the added convenience to change the type of friction pad easily to accommodate changing conditions or users, as well as to increase ease of use (e.g. reduction in mess) when traveling. Friction pads can also find use on areas where slipping is undesirable, such as boat decks, skateboard decks, stand-up paddleboards, sports boards, jet skis, bats, hockey sticks, rackets, golf clubs, handle bar grips, and the like.

To apply the friction pad to a surface, such as a surfboard, the intended surface must be cleaned to remove any debris, old wax, or old adhesive. An arrangement for one or more friction pads is decided upon, and any cutting is done. The protective backing, if present, is removed from the adhesive layer. The friction pad is pressed into the surface in a manner that can prevent the formation of air bubble between the friction pad and the board. In some implementations, a sharp instrument, such as a pin, needle, or small blade, can be used to create holes in the friction pad that can release air caught between the friction pad and board, preventing the formation of air bubbles. When present, a protective layer above the traction layer is removed before using the board. If needed, the friction pad or pads are activated. In some instances, a user can use traditional wax to further customize the traction on his or her surfboard (or other surface) at any time after application of the friction pad to the board or other surface. For example, a user can use traditional wax after the initial or repeated uses of his or her board with the friction pad applied. Alternatively, the user can use traditional wax only once, initially, or after every use of his or her board with the friction pad applied.

FIG. 4A shows an implementation of a friction pad in an exemplary shape. Friction pads as described above can be made to any suitable shape, depending on the intended application. For example, friction pads intended for use on a surfboard can have the hexagonal shape shown in FIG. 4A so as to allow for placement of one or more in a variety of configurations on a board without becoming unwieldy in size. The friction pad 400 shown in FIG. 4A has a tab 410 to facilitate removal of a protective layer that can be over the adhesive on the back of the support layer, as well as texture features 425. FIG. 4B shows an arrangement of multiple friction pads 400 on a surfboard. The arrangement can be decided upon based upon where a user (e.g. surfer) usually stands or usually applies traditional traction materials, like wax.

FIG. 5A shows another implementation of a friction pad 500. This friction pad 500 is shown with a protective layer covering the adhesive on the back side of the support sheet. In the protective layer, there can be a break, or crack, 505. There can also be a tab 510 that facilitates in removal of the protective layer. The break, or crack, 505 can allow for removal of only part of the protective layer during application of the friction pad 500 to a surface.

Though the friction pad 500 is shown as substantially rectangular with rounded corners, the friction pad can be any suitable shape, such as a regular geometric shape. The size of the friction pad is indicated in FIG. 5A as 5.5 inches (about 14 cm) by 8 inches (about 20 cm). The size of the friction pad can be larger and then cut by a user to his or her liking, or the friction pad can be a smaller size. Additionally, the friction pad can be available in multiple sizes, and friction pads of more than one size can be used to cover a surface to a user's liking.

Figure 5B:
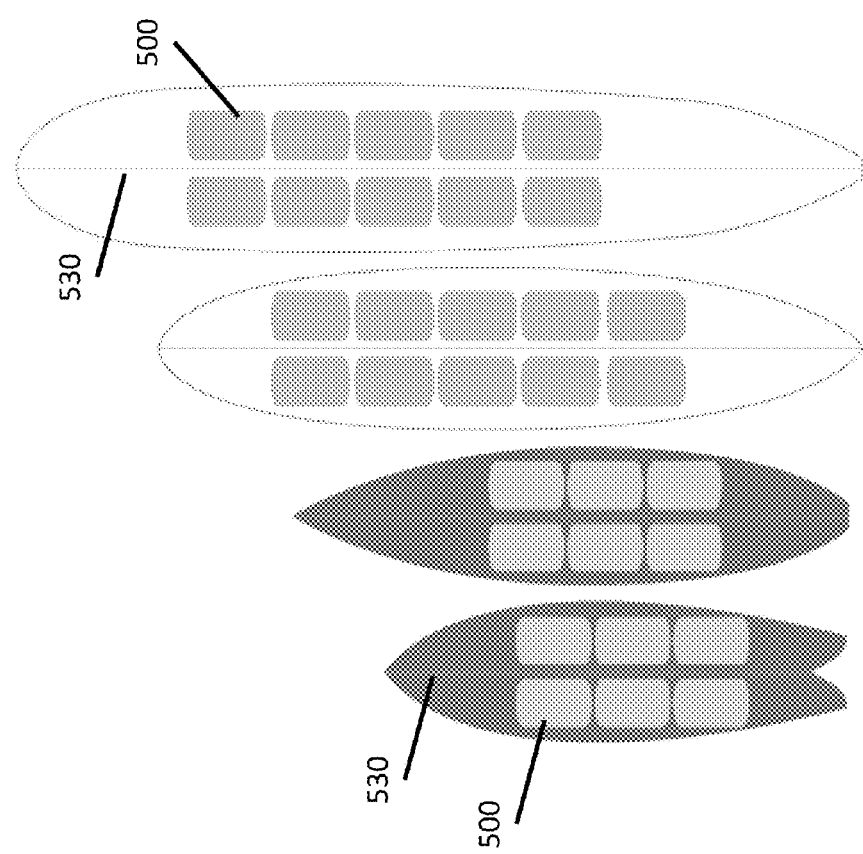

FIG. 5B shows various shapes of surfboards and implementations of applications of friction pads 500 to these boards. Most surfboards have a line down the middle of the board called a stringer 530. The friction pads 500 can be aligned with the stringer 530 to cover the portion of the surfboard where a surfer normally lays and stands. When used with other equipment, the user can use features of the equipment to align placement of the friction pads 500, in addition to, or in place of, using his or her best judgment of where increased friction can be desirable.

Though the description above is in terms of a surfboard and surfer, the articles of manufacture, compositions, and methods can be applied to a user and any vessel, conveyance, sports board, or other implement that may require a clean means of increasing friction in select locations on a surface. A sports board can include a surfboard, a skateboard, a snowboard, a wakeboard, a kiteboard, a paddle board, and the like. Other locations that can benefit from localized increases of friction include decks, walk ways that become wet, stairs, as well as handles and handholds on items such as paddles and racquets.

The implementations set forth in the foregoing description do not represent all implementations consistent with the subject matter described herein. Instead, they are merely some examples consistent with aspects related to the described subject matter. Wherever possible, the same reference numbers will be used throughout the drawings to refer to the same or like parts.

Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows and steps for use described herein do not require the particular order shown, or sequential order, to achieve desirable results. Similarly, elements located on the front, back, side, top, or bottom of an embodiment or implementation are to be understood as relatively positioned. Other embodiments can be within the scope of the claims.

What is claimed is:

1. A method of making a friction pad, comprising:
mixing a combination of materials, the combination comprising water, corn starch and acrylic stucco;
curing the mixed combination of materials;
spraying the cured combination of materials onto a flexible support sheet on a top side of the flexible support sheet opposite an adhesive side of the flexible support sheet, the adhesive side of the flexible support sheet having an adhesive that is covered by a removable cover layer;
soaking the flexible support sheet with the sprayed combination of materials in salt water for at least 24 hours;
melting an oil and wax combination;
applying the oil and wax combination to the flexible support sheet onto the sprayed combination of materials; and
soaking the flexible support sheet with the sprayed combination of materials and the applied oil and wax combination in salt water for at least 24 hours to produce the friction pad.

2. The method in accordance with claim 1, wherein the combination of materials further comprises approximately ¼ part water, approximately ⅛ part corn starch, and approximately 1 part acrylic stucco.

3. The method in accordance with claim 2, wherein the combination of materials further comprises approximately ⅛ part tree sap.

4. The method in accordance with claim 1, further comprising sanding, with sand paper, the sprayed combination of materials after soaking in the salt water.

5. The method in accordance with claim 1, wherein the oil and wax combination comprises approximately ½ part microcrystalline wax, approximately ⅛ part coconut oil, approximately ⅛ part petroleum jelly, and approximately ¼ part beeswax.

6. The method in accordance with claim 1, further comprising perforating the flexible support sheet with the sprayed combination of materials and the applied oil and wax combination.

* * * * *